United States Patent
Sekikawa et al.

(10) Patent No.: US 12,315,216 B2
(45) Date of Patent: May 27, 2025

(54) IMAGE RESTORATION DEVICE, IMAGE RESTORATION METHOD, AND IMAGE RESTORATION PROGRAM

(71) Applicants: DENSO WAVE INCORPORATED, Aichi-pref. (JP); DENSO IT LABORATORY, INC., Tokyo (JP)

(72) Inventors: Yusuke Sekikawa, Tokyo (JP); Yang Shi, Tokyo (JP)

(73) Assignees: DENSO WAVE INCORPORATED, Aichi-pref. (JP); DENSO IT LABORATORY, INC., Tokyo (JP)

(*) Notice: Subject to any disclaimer, the term of this patent is extended or adjusted under 35 U.S.C. 154(b) by 327 days.

(21) Appl. No.: 17/777,207

(22) PCT Filed: Nov. 13, 2020

(86) PCT No.: PCT/JP2020/042461
§ 371 (c)(1),
(2) Date: May 16, 2022

(87) PCT Pub. No.: WO2021/095853
PCT Pub. Date: May 20, 2021

(65) Prior Publication Data
US 2022/0406032 A1    Dec. 22, 2022

(30) Foreign Application Priority Data

Nov. 15, 2019    (JP) .................................. 2019-207197
Oct. 28, 2020    (JP) .................................. 2020-180824

(51) Int. Cl.
*G06V 10/98*    (2022.01)
*G06T 5/77*    (2024.01)
(Continued)

(52) U.S. Cl.
CPC ................ *G06V 10/60* (2022.01); *G06T 5/77* (2024.01); *G06T 7/20* (2013.01); *G06V 10/98* (2022.01)

(58) Field of Classification Search
CPC . G06T 2207/10016; G06T 2207/30208; G06T 5/50; G06T 5/77; G06T 7/20; G06V 10/60; G06V 10/98
See application file for complete search history.

(56) References Cited

U.S. PATENT DOCUMENTS

2020/0111220 A1* 4/2020 Delbruck ................ G06T 7/223
2020/0175238 A1* 6/2020 Müller ............... G06K 7/10722
2021/0014435 A1* 1/2021 Seo ........................ H04N 25/75

FOREIGN PATENT DOCUMENTS

WO    2019/067731 A1    4/2019

OTHER PUBLICATIONS

Bardow, P. et al., "Simultaneous Optical Flow and Intensity Estimation from an Event Camera," The IEEE Conference on Computer Vision and Pattern Recognition (CVPR), pp. 884-892, 2016.
(Continued)

*Primary Examiner* — Ian L Lemieux
(74) *Attorney, Agent, or Firm* — Oliff PLC

(57) ABSTRACT

The image restoration device has an initialization block that initializes the luminance value of each pixel coordinate to an intermediate value in the luminance array list that stores one of a pair of polarity values and intermediate values as the luminance value for each pixel coordinate. The image restoration device also has an update block that updates the initialized luminance array list according to the pixel coordinates and polarity values for each event, and an output block that outputs the luminance array list updated by the update block over the shooting period as a binary image. By the update performed in the update block, the luminance values of the firing coordinates where the event fired in the (Continued)

luminance array list are overwritten by the polarity values of the event. In addition, the update preserves the luminance values of the non-firing coordinates in the luminance array list, excluding the firing coordinates.

18 Claims, 9 Drawing Sheets

(51) Int. Cl.
*G06T 7/20* (2017.01)
*G06V 10/60* (2022.01)

(56) References Cited

OTHER PUBLICATIONS

SSII2019 [USB], Jun. 13, 2019, column "3 suggested techn ique", fig. 3, non-official translation (Nagata, Jun et al., "QR code recognition that is sturdy against lighting conditions an d blur using an event camera").
Pan et al.; "High Frame Rate Video Reconstruction based on an Event Camera"; Journal of Latex Class Files; vol. 14; No. 8; Aug. 2015; pp. 1-13.
Scheerlinck et al.; "Continuous-Time Intensity Estimation Using Event Cameras"; The Australian National University; https://www.data61.csiro.au; 2019; pp. 308-324.
Munda et al.; "Real-Time Intensity-Image Reconstruction for Event Cameras Using Manifold Regularisation"; International Journal of Computer Vision; 2018; pp. 1381-1393.

\* cited by examiner

FIG.6

HORIZONTAL →

VERTICAL ↓

| [x, y, I, T]<br>=[1, 1, 0.5, 0] | [x, y, I, T]<br>=[2, 1, 0.5, 0] | | [x, y, I, T]<br>=[X, 1, 0.5, 0] |
|---|---|---|---|
| • • • | • • • | • • • | • • • |
| [x, y, I, T]<br>=[1, Y-1, 1, 0.5] | [x, y, I, T]<br>=[2, Y-1, 1, 1] | | [x, y, I, T]<br>=[X, Y-1, 0, 0.5] |
| [x, y, I, T]<br>=[1, Y, 0.5, 0] | [x, y, I, T]<br>=[2, Y, 0.5, 0] | | [x, y, I, T]<br>=[X, Y, 0.5, 0] |

HORIZONTAL →

VERTICAL ↓

| [x, y, I, T]<br>=[1, 1, 0.5, 0] | [x, y, I, T]<br>=[2, 1, 0.5, 0] | | [x, y, I, T]<br>=[X, 1, 0.5, 0] |
|---|---|---|---|
| • • • | • • • | • • • | • • • |
| [x, y, I, T]<br>=[1, Y-1, 0.5, 0] | [x, y, I, T]<br>=[2, Y-1, 0.5, 0] | | [x, y, I, T]<br>=[X, Y-1, 0.5, 0] |
| [x, y, I, T]<br>=[1, Y, 0.5, 0] | [x, y, I, T]<br>=[2, Y, 0.5, 0] | | [x, y, I, T]<br>=[X, Y, 0.5, 0] |

L

IMAGE RESTORATION DEVICE, IMAGE RESTORATION METHOD, AND IMAGE RESTORATION PROGRAM

The present disclosure relates to an image restoration technique that recovers a binary image based on the output from an event camera.

BACKGROUND TECHNOLOGY

An event camera (Event Based Camera or simply, Event Camera) with excellent temporal resolution is known as an optical camera that mimics the human perception system. The event camera takes an optical image of a subject and outputs the pixel coordinates and polarity values of the event associated with the time of the onset of an event in which the luminance changes in at least one camera pixel.

Techniques for restoring luminance images based on the output of such event cameras are disclosed, for example, in the non-patent literature 1. In the technique disclosed in the non-patent document 1, the luminance image is recovered by simultaneously estimating the optical flow and luminance of a subject in motion relative to the event camera by optimizing a cost function.

PRIOR ART DOCUMENTS

Non-Patent Documents

Non-Patent Document 1: P. Bardow, A. J. Davison, and S. Leutenegger. Simultaneous Optical Flow and Intensity Estimation From an Event Camera. The IEEE Conference on Computer Vision and Pattern Recognition (CVPR), pp. 884-892, 2016.

SUMMARY OF THE INVENTION

Subject of the Invention

The object for which the technology disclosed in the non-patent document 1 estimates optical flow and luminance simultaneously is limited to the edge areas where changes can be detected. Therefore, in order to extend the luminance estimation to the entire photographed surface of the subject and restore the luminance image, the computation process becomes complicated and the computational load increases.

It is a subject of the present disclosure to develop an image restoration device that reduces the computational load required for image restoration. Another subject of the present disclosure is to provide an image restoration method that reduces the computational load required for image restoration. Another subject of the present disclosure is to provide an image restoration program that reduces the computational load required for image restoration.

Means to Achieve the Subject

The technical means of the present disclosure for achieving the subject are described below. The symbols in parentheses in the claims and in this column indicate the correspondence with the specific means described in the embodiments described in detail later, and do not limit the technical scope of the present disclosure.

The first aspect of the present disclosure is as follows: An image restoration device (3) that recovers a binary image (B) based on the pixel coordinates (x, y) and polarity value (p) of an event, which are output from an event camera (2) that captures a black-and-white subject (4) in relative motion during the shooting period, in association with the time of ignition (t) of the event in which the brightness has changed in at least one camera pixel.

The image restoration device (3) has an initialization section (100) that initializes the luminance value of each pixel coordinate to an intermediate value in a luminance array list (L), which stores at least one of a pair of polar values and the intermediate values as the luminance value for each pixel coordinate.

The image restoration device (3) has an update unit (120) that updates the luminance array list initialized by the initialization unit according to the pixel coordinates and polarity values for each event.

The image restoration device (3) has an output unit (160) that outputs the luminance array list updated by the update unit over the shooting period as a binary image.

The update by the update section overwrites the luminance value of the firing coordinate, which is the pixel coordinate where the event has fired in the luminance array list, with the polarity value of the event while retaining the luminance values of the non-firing coordinates within the luminance array list.

A second aspect of the present disclosure is an image restoration method performed by a processor (12) which recovers a binary image (B) based on the pixel coordinates (x, y) and polarity value (p) of the event which is output from an event camera (2) that captures a black-and-white subject (4) in relative motion during the shooting period in association with the ignition time (t) of the event in which the brightness in at least one camera pixel has changed.

The image restoration method has an initialization process (S101) that initializes the luminance value of each pixel coordinate to an intermediate value in the luminance array list (L) that stores one of a pair of polar values and their intermediate values as the luminance value for each pixel coordinate.

The image restoration method has an update process (S102, S202) to update the luminance array list initialized by the initialization process according to the pixel coordinates and polarity values for each event.

The image restoration method has an output process (S104) to output the luminance array list updated by the update process over the shooting period as binary images.

The update process overwrites the luminance values of the firing coordinates, which are the pixel coordinates in the luminance array list where an event has fired, with the polarity values of the event, and retains the luminance values of the non-firing coordinates, which are the pixel coordinates excluding the firing coordinates in the luminance array list.

A third aspect of the present disclosure is an image restoration program stored in a storage medium (10) and containing instructions to be executed by a processor (12), for restoring a binary image (B) based on pixel coordinates (x, y) and polarity value (p) of an event, output from an event camera (2) that has captured a black-and-white subject (4) in relative motion within a shooting period, associated with an ignition time (t) of an event in which luminance has changed in at least one camera pixel.

The instructions include an initialization process (S101) that initializes the luminance value of each pixel coordinate to an intermediate value in the luminance array list (L) that is stored as a degree value.

The instructions include an update process (S102, S202) to update the luminance array list initialized by the initialization process according to the pixel coordinates and polarity values for each event.

The instructions include an output process (S104) for outputting the luminance array list updated over the shooting period by the update process as a binary image.

The update process overwrites the luminance values of the firing coordinates, which are the pixel coordinates in the luminance array list where an event has fired, with the polarity values of the event, while retaining the luminance values of the non-firing coordinates, which are the pixel coordinates excluding the firing coordinates in the luminance array list.

According to these first to third aspects, the luminance value of each pixel coordinate is initialized to an intermediate value. The luminance array list has been updated according to the pixel coordinates and polarity values for each event. The luminance value of the firing coordinate is overwritten by the polarity value of the event. In this case, the polarity value overwritten with the luminance value can represent the actual luminance of the part of the photographed surface of the black-and-white subject that fires an event on the camera pixel by relative movement. According to the first through third aspects, the updates to the initialized luminance array list are remained the polarity values retained in the non-firing coordinates. As a result, the polarity values retained in the non-firing coordinates that are switched from the firing coordinates after the polarity value overwriting operation can represent the actual luminance of the portion of the photographed surface that does not fire events even by relative movement.

Based on the above, the luminance array list updated over the shooting period by the first to third aspects can be output as a binary image in which the polarity values corresponding to the actual luminance are stored in each pixel coordinate corresponding to the surface to be shot, respectively. Accordingly, a binary image can be restored by a simple arithmetic operation of overwriting, thus reducing the arithmetic load required for image restoration.

BRIEF DESCRIPTION OF THE DRAWINGS

In he attached drawings:

FIG. 6 Schematic diagram to illustrate the luminance array list according to the first embodiment.

FIG. 7 Schematic diagram to illustrate the initialization process according to the first embodiment.

EMBODIMENTS OF THE INVENTION

A plurality of embodiments will be described below based on the drawings. In each embodiment, as the same sign is attached to the corresponding components, duplicate explanations may be omitted. When only a part of a configuration is described in each embodiment, the configuration of other embodiments described previously may be applied to other parts of the configuration concerned. In addition, not only the combination of the configurations explicitly described in the explanation of each embodiment, but also the partial combination of the configurations of multiple embodiments with each other, even if not explicitly described, is possible if there is no particular obstacle to the combination.

First Embodiment

Figure 1:
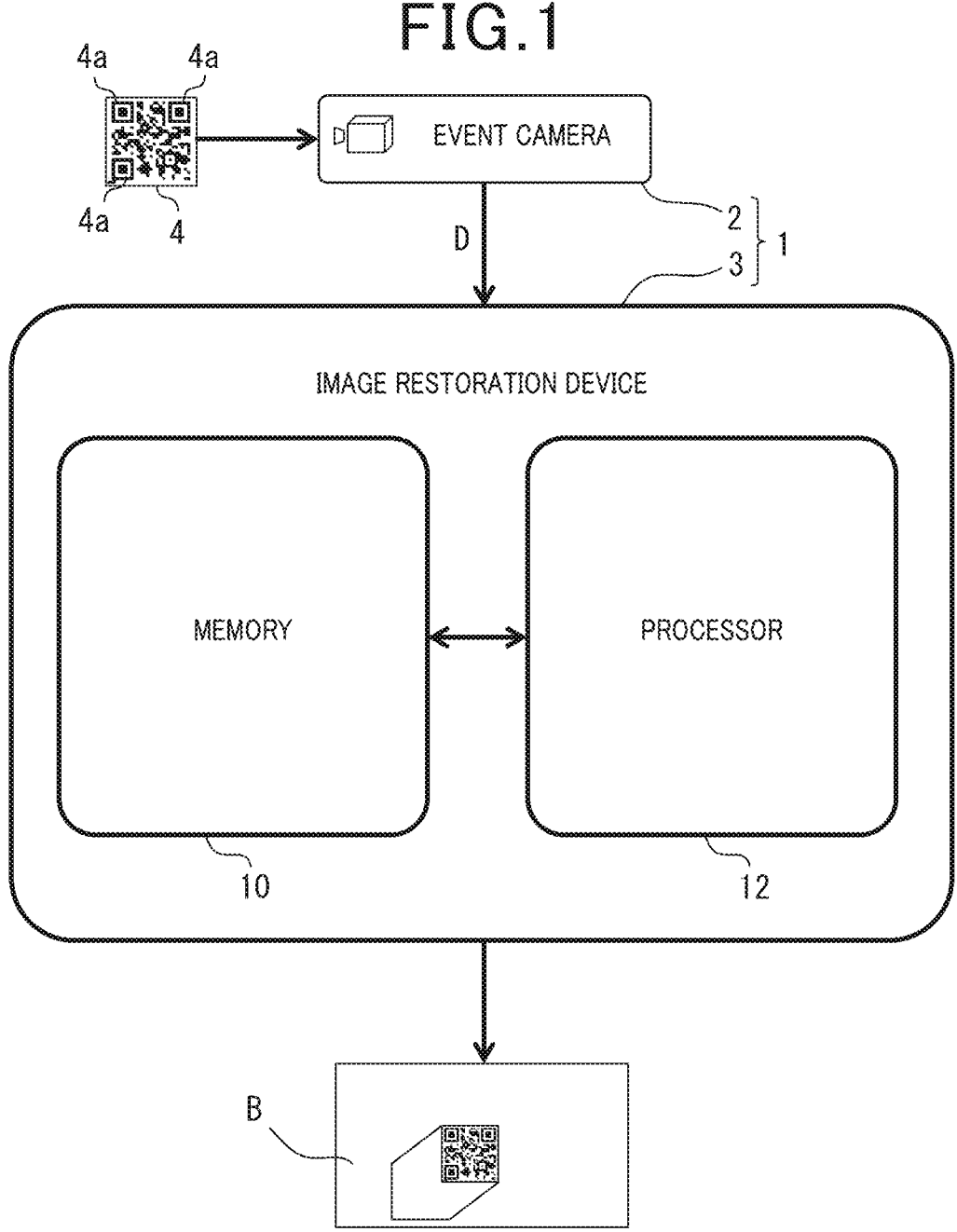
FIG. 1 Block diagram of the overall configuration of the image system according to the first embodiment FIG. 2 Block diagram showing the detailed configuration of the image restoration device in the image system according to the second embodiment.
Figure 2:
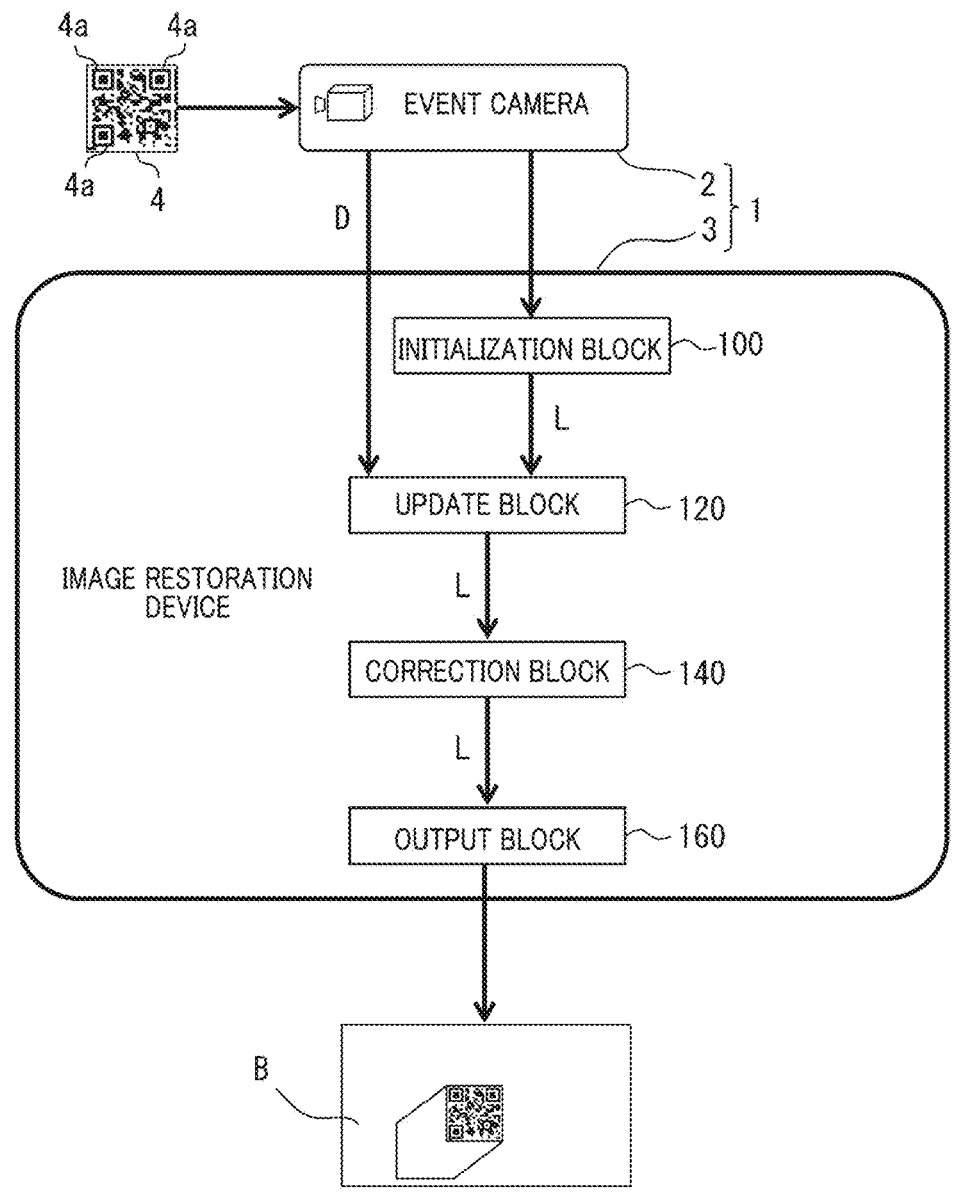

As shown in FIGS. 1 and 2, the image system 1 according to the first embodiment includes an event camera (Event Based Camera) 2 and an image restoration device 3. In the image system 1, a binary image B as a bi-tonal luminance image is recovered by the image restoration device 3 based on the output from an event camera 2 that captures a bi-tonal black and white subject 4. In the binary image B restored by the image restoration device 3, the luminance value (i.e., tonal value) representing the black portion of the black-and-white subject 4 is "0" and the white portion of the subject 4 is "1".

Figure 3:
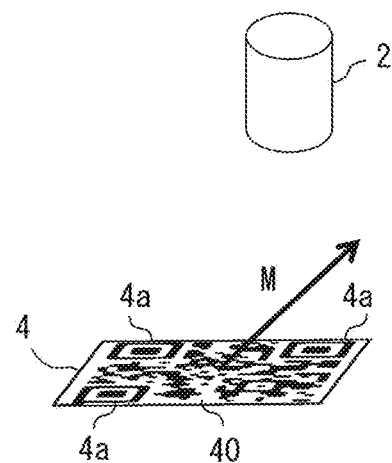
FIG. 3 Perspective vies explaining the relative motion relationship between an event camera and a black-and-white subject according to the first embodiment.
Figure 4:
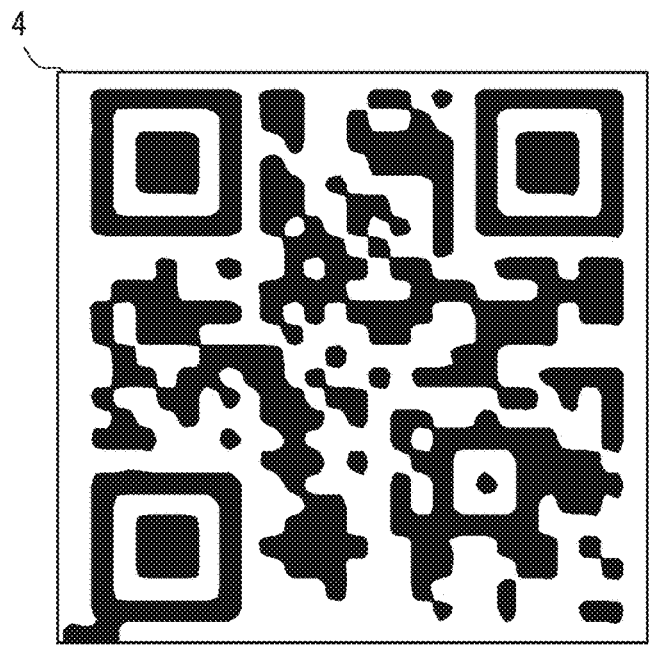
FIG. 4 A plan view of a shooting subject according to the first embodiment.

The event camera 2 is positioned to capture a specific image from the black-and-white subject 4 to be photographed. The camera 2 is installed in a state where a relative motion relationship is established. The specific relative motion relationship is a so-called translational motion relationship in which the direction of the optical flow generated by the relative motion to the event camera 2 during the shooting period. The relative motion is the same for the entire area of the black-and-white subject 4 to be photographed by the event camera 2. An example of this translational motion relationship is when a flat black-and-white subject 4 is placed in front of the event camera 2, which is fixed in position. As shown in FIG. 4, a two-dimensional code drawn in black and white as a flat black-and-white object 4 is printed or pasted on a product made within a factory, for example, and moves in a straight line due to conveyor movement, as shown in FIG. 3. The two-dimensional code shown in FIG. 4 is a QR code (registered trademark of Denso Wave Co., Ltd.), but it may also be a bar code, for example.

Figure 5:
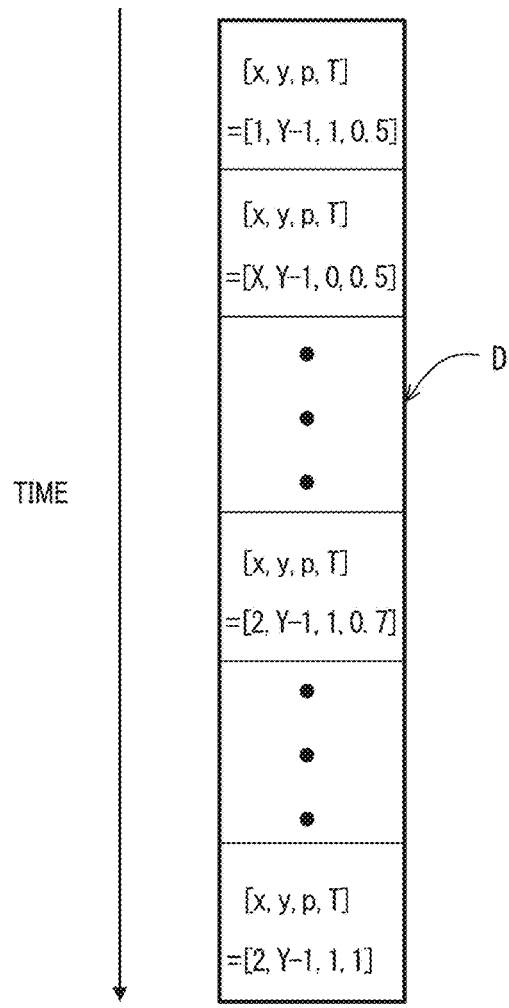
FIG. 5 Schematic diagram to illustrate event data according to the first embodiment.

As shown in FIG. 3, the event camera 2 captures the photographed surface 40 of a black-and-white subject 4 in relative motion during a predetermined shooting period within the camera angle of view over the said shooting period. The event camera 2 senses the incident light from within the camera angle of view by means of a plurality of camera pixels arranged in a two-dimensional array in the horizontal and vertical directions. In the event camera 2, the brightness change of the incident light sensed by each camera pixel is monitored chronologically during the shooting period. As a result, when the amount of luminance change in the direction of increase or decrease in at least one camera pixel exceeds the threshold value in the log order, the event data D is output from the event camera 2 as if an event has occurred. As shown in FIG. 5, the event data D outputs the pixel coordinates x, y, and polarity value p of the event in association with the event's ignition time t. In FIG. 5 and FIGS. 6 to 8 below, the maximum value of each coordinate x, y is represented by X, Y respectively.

The pixel coordinates x, y define the vertical and horizontal two-dimensional positions of the camera pixels whose luminance has changed by more than a threshold value. The polarity value p defines the direction of the increase or decrease in luminance above the threshold value by a binary value. In particular, in this embodiment, the polarity value p, which represents the direction of luminance increase from black to white, is specified as "1", while the polarity value p, which represents the direction of luminance decrease from white to black, is specified as "0". In this way, in the event data D, the direction of increase or decrease of luminance change at the pixel coordinates x, y where the event occurred is represented by a pair of polarity values p.

The image restoration device 3 shown in FIGS. 1 and 2 is connected to the event camera 2 via at least one type of a LAN (Local Area Network), wiring harness and an internal bus. As shown in FIG. 1, the image restoration device 3 is a computer dedicated to image restoration, comprising at least one memory 10 and at least one processor 12. The memory 10 is a non-transitory substantive storage medium (non-transitory tangible storage medium) of at least one type, such as semiconductor memory, magnetic media, optical media, etc., that stores programs and data readable by the computer. The processor 12 is, for example, a CPU (Central Processing Unit). The processor 12 includes at least one type of core, such as a CPU (Central Processing Unit), GPU (Graphics Processing Unit), or RISC (Reduced Instruction Set Computer)-CPU.

The processor 12 executes a plurality of instructions contained in the image restoration program stored in the memory 10. As a result, the image restoration device 3 constructs a plurality of functional blocks for restoring a binary image B based on the event data D output from the event camera 2. Thus, in the image restoration device 3, a plurality of functional blocks are constructed by the processor 12 sequentially or in parallel executing a plurality of instructions of the image restoration program stored in the memory 10 to restore the binary image B. The plurality of functional blocks constructed by the image restoration device 3, as shown in FIG. 2, includes the initialization block 100, update block 120, correction block 140, and output block 160.

The initialization block 100 prepares a luminance array list L in a predetermined data storage area in the memory 10. As shown in FIG. 6, the luminance array list L is prepared as a data set in which luminance values I and time stamps T are associated and stored for each vertical and horizontal two-dimensional pixel coordinates x and y corresponding to all camera pixels of the event camera 2. The luminance values I to be stored in the luminance array list L are each of a pair of polarity values p corresponding to the two-gradation luminance values of the binary image B and their intermediate value m. The intermediate value m is defined as the range between the binary values that are the pair of polarity values p. In particular, in this embodiment, the intermediate value m is defined as "0.5", which is the median value between "1", which is the polarity value p in the luminance increase direction corresponding to the white luminance value of the binary image B, and "0", which is the polarity value p in the luminance decrease direction corresponding to the black luminance value of the same image B.

As shown in FIG. 7, the initialization block 100 initializes all the luminance values I of each pixel coordinates x, y in the luminance array list L to the intermediate value m. Along with that, the initialization block 100 initializes all the timestamps T of each pixel coordinates x, y in the luminance array list L to "0" as the reset value. These initialization processes are realized by the initialization block 100 before or upon the start of the shooting period by the event camera 2.

The update block 120 shown in FIG. 2 obtains event data D for each event in the shooting period from the event camera 2. The update block 120 may acquire the event data D that is output from the event camera 2 for each firing time t, respectively, for the same time t. The update block 120 may keep the event data D that is output from the event camera 2 at each firing time t in the memory 10 for a set period of time, such as within a shooting period, and acquire the event data D collectively after the set period of time.

For each event for which the event data D is acquired, the update block 120 updates the luminance array list L in accordance with the event data D according to the firing time t, pixel coordinates x, y, and polarity value p. The update block 120 may update the luminance array list L for each firing time t at which the event data D is acquired. The update block 120 may sequentially extract the data for each firing time t from the buffered event data D, and update the luminance array list L for each such extraction. In the following, the update process in either case is described in detail as a process for each event.

Figure 8:
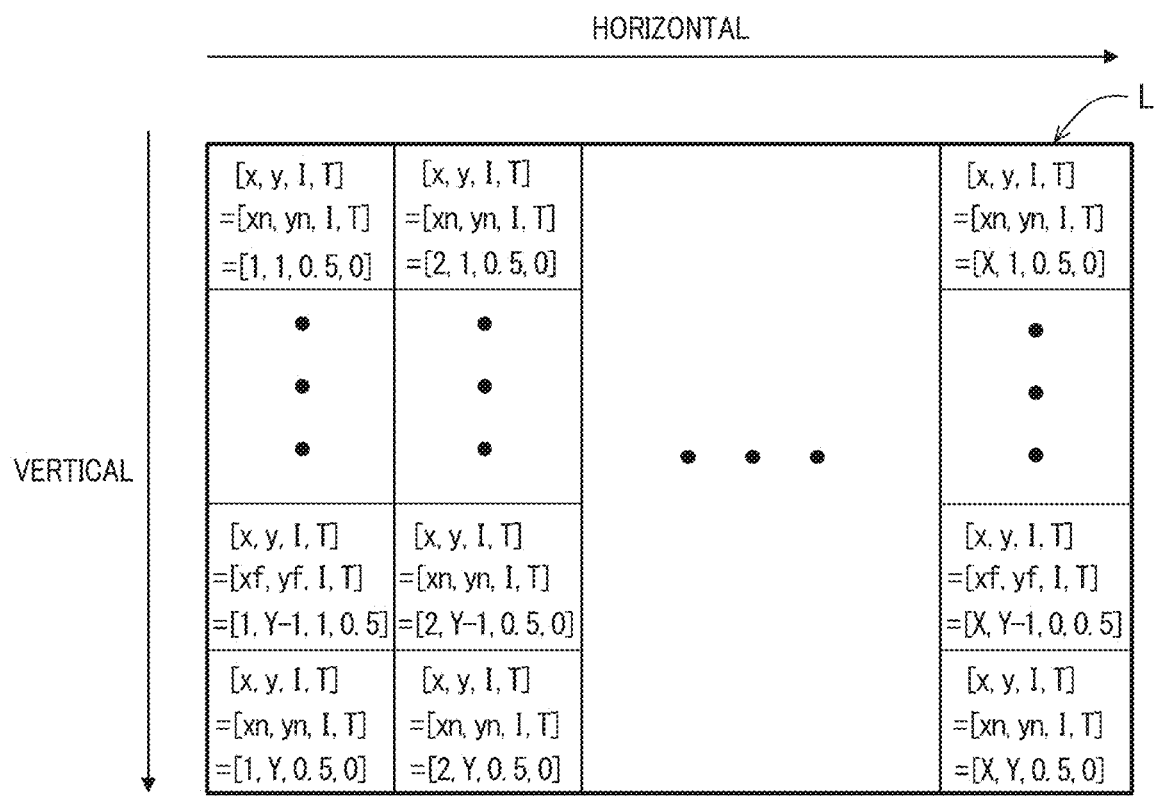
FIG. 8 Schematic diagram to illustrate the update process according to the first embodiment.

As shown in FIG. 8, the update block 120 of the update process sets the pixel coordinates x, y in the luminance array list L corresponding to the pixel coordinates x, y at the firing time t in the event data D to the firing coordinates xf, yf at the firing time t when the event fired. Along with that, the update block 120 sets all the pixel coordinates x, y in the luminance array list L, except for the firing coordinates xf, yf, to the non-firing coordinates xn, yn at the firing time t.

The update block 120 of the update process overwrites the luminance value I of the firing coordinates xf, yf at the firing time t in the luminance array list L by the polarity value p of the event at the firing time t in the event data D. At the same time, the update block 120 overwrites the timestamp T of the firing coordinates xf, yf at the firing time t in the luminance array list L with the firing time t of the event in the event data D. At this time, the update block 120 of this embodiment uses the start time of the shooting period as the standard "0" second, replaces the firing time t with the elapsed time from the said start time, and stores it in the time stamp T.

In these overwrites, on the other hand, the update block 120 of the update process keeps the luminance value I of the non-firing coordinates xn, yn at the firing time t in the luminance array list L, where the time difference between the firing time t and the time stamp T is within the allowable time range, as the stored value at the firing time t. As a result, the luminance values I of the non-firing coordinates xn, yn that have been switched from the firing coordinates xf, yf in the luminance array list L are retained within the allowable time range from the firing time t of the coordinates xf, yf before the switch.

However, the non-firing coordinates xn, yn at firing time t in the luminance array list L of these, the luminance value I of the coordinate whose time difference between the ignition time t and the time stamp T is outside the allowable time range is returned to the intermediate value m by the update block 120 through an overwrite operation. As a result, the luminance values I of the non-firing coordinates xn, yn, which have been switched from the firing coordinates xf, yf in the luminance array list L, will be overwritten by the intermediate value m outside the allowable time range from the firing time t of the coordinates xf, yf before the switch.

The allowable time range for switching the contents of the update process based on the time difference in this way may be set below the upper limit of the time difference in which luminance values I should be retained, or below the lower limit of the time difference in which luminance values I should be calculated to be overwritten by intermediate values m.

The correction block 140 shown in FIG. 2 corrects the luminance array list L updated over the shooting period by the update block 120. In other words, the correction block 140 corrects the luminance array list L that has been updated according to the event data D of all events in the shooting period. In the following, the correction process by the correction block 140 is described in detail as the process for the luminance array list L after all updates.

Figure 9:
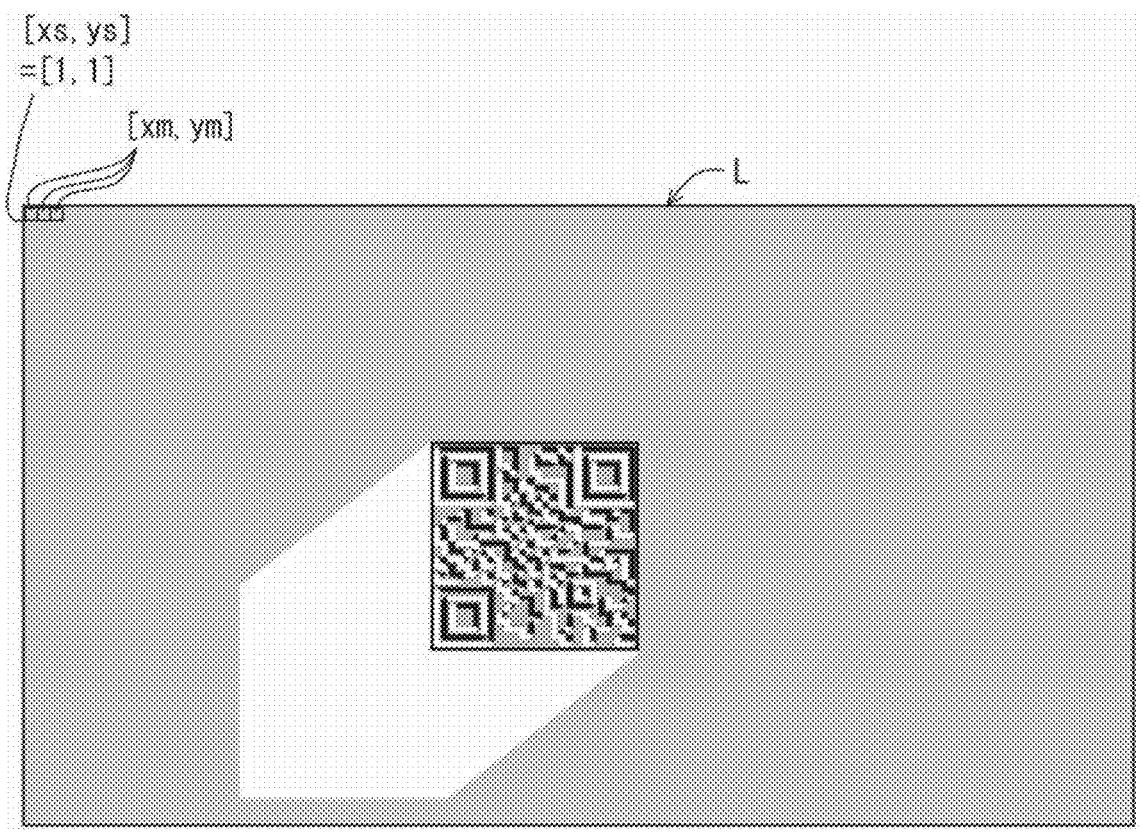
FIG. 9 Schematic view for explaining the first sub-correction process according to the first embodiment.

The correction block 140 of the correction process sets all the pixel coordinates x, y where the intermediate values m are stored in the luminance array list L after all the updates to the intermediate coordinates xm, ym. Under this setting, the update block 120 performs the first sub-correction process and the second sub-correction process to correct the luminance values I of the intermediate coordinates xm, ym in the luminance array list L from the intermediate values m to the proper values. In order to explain the first sub-correction process, FIG. 9 shows the entire luminance array list L in an image view. On the other hand, to illustrate the second sub-correction process, FIG. 10 shows an image view of a part of the luminance array list L.

The correction block 140 of the first sub-correction process extracts the intermediate coordinates xm, ym, which constitute the edge portions of the luminance array list L, as the starting point coordinates xs, ys, as shown in FIG. 9. At this time, the correction block 140 extracts the starting point coordinates xs, ys from the luminance array list L as shown in FIG. 9, where at least one of the coordinates x,y in the vertical and horizontal directions is the minimum or maximum value (FIG. 9 is an example where both are the minimum value) and the other is the maximum value. The correction block 140 of the first sub-correction process overwrites both the luminance 1 of the continued coordinates which is continued directly with the starting point coordinates xs, ys or indirectly via another intermediate coordinates xm, ym with the starting point coordinates xs, ys and the luminance 1 of the starting point coordinates xs, ys. In the case the black-and-white object 4 is a two-dimensional code, the value "1", which represents the direction of luminance increase corresponding to the white luminance value of the binary image B, is used as the starting point coordinates xs and ys, and their successive coordinates as the polarity value p of the specific one. Note that the process of "overwrites the luminance value of the firing coordinate, which is the pixel coordinate where the event has fired in the luminance array list, with the polarity value of the event, while the luminance value of the non-firing coordinate, which is the pixel coordinate excluding the firing coordinate in the luminance array list is retained" in the present disclosure is proceeded in the first sub correction process. In this regard, the first sub-correction process is the main process.

Figure 10:
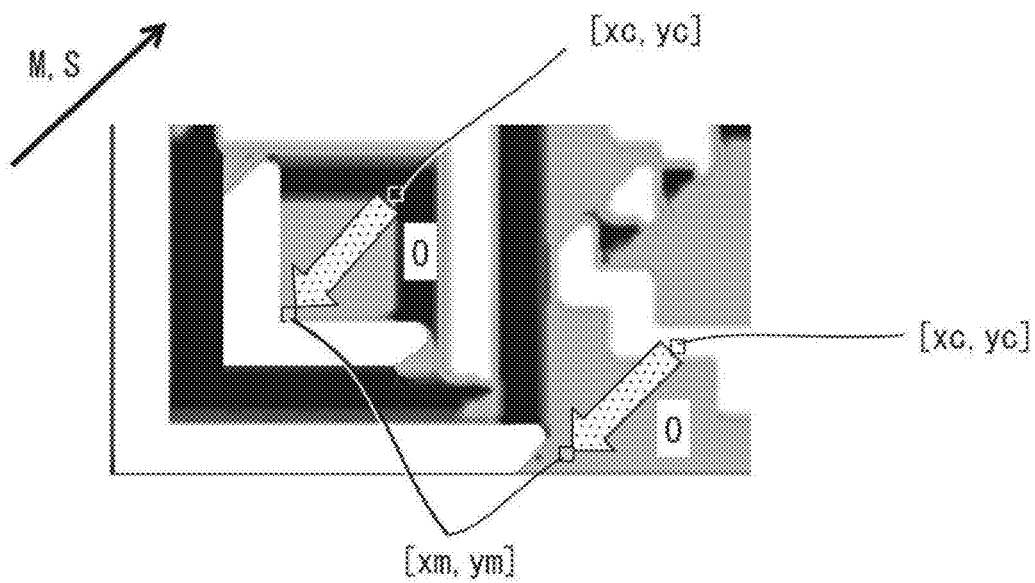
FIG. 10 Schematic view for explaining the second sub-correction process according to the first embodiment.

The correction block 140 of the second sub-correction process sets the direction of motion M of the black-and-white subject 4 relative to the event camera 2 to the search direction S, as shown in FIG. 10. In this case, the relative motion direction M is set to the search direction S. At this time, the relative motion direction M is set to the search direction S by being calculated based on, for example, the output value from the acceleration sensor. The correction block 140 of the second sub-correction process searches for the coordinates of interest xc, yc, which are nearest to the search direction S, from among the intermediate coordinates xm, ym in the luminance array list L, where the luminance value 1 remains as the intermediate value m even by the first sub-correction process. The correction block 140 of the second sub-correction process overwrites the luminance values 1 of the remaining coordinates with intermediate values m in the luminance array list L with the polarity values p of the attention coordinates xc and yc. As a result, the luminance values I of the remaining coordinates are copied with the polarity values p of the attention coordinates xc, yc in the direction O opposite to the search direction S shown in FIG. 10. By adding the second sub-correction process in this way, the polarity value p can be identified without waiting for the main first sub-correction process to finish reading all of the event data D.

Figure 11:
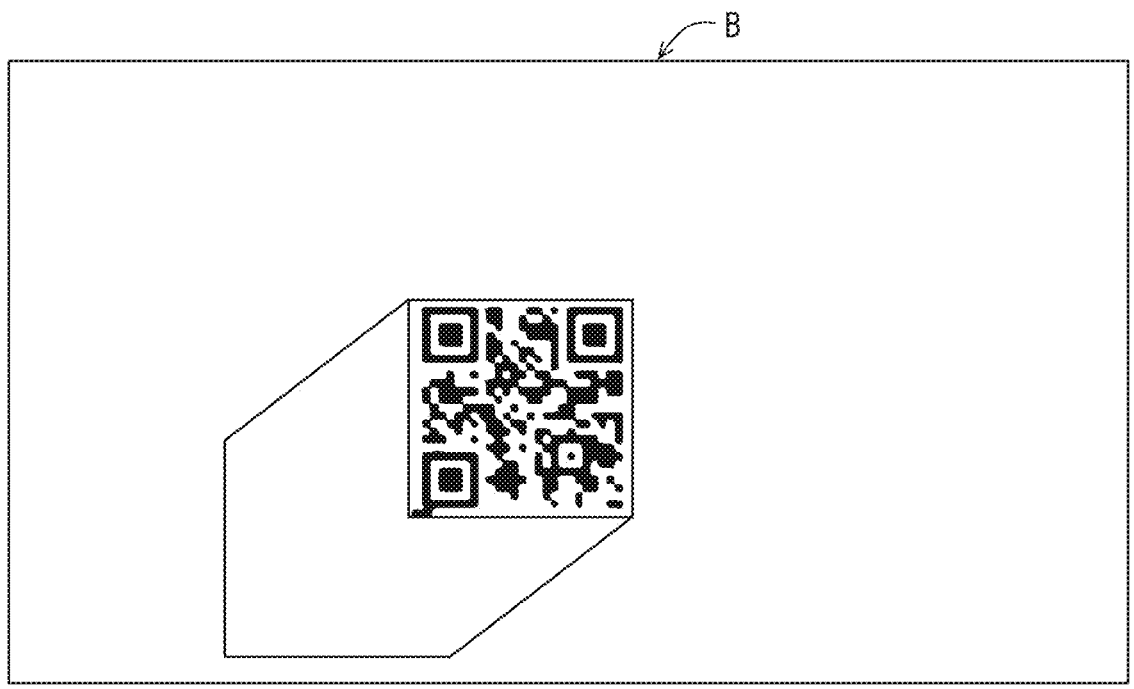
FIG. 11 Schematic view of a binary image according to the first embodiment

The output block 160 shown in FIG. 2 outputs the luminance array list L that has been corrected by the correction block 140 in addition to the luminance array list being updated over a period of time by the updating block 140 as a binary image B. That is, the output block 160 restores the latest luminance array list L, in which the intermediate coordinates xm, ym have been corrected to one of the polarity values p after being updated by the event data D at all firing times t in the shooting period, as the binary image B to be output as shown in FIG. 11.

From the description so far, in the first embodiment, the initialization block 100 corresponds to the "initialization section" and the update block 120 corresponds to the "update section". Also in the first embodiment, the correction block 140 corresponds to the "correction section" and the output block 160 corresponds to the "output section".

Figure 12:
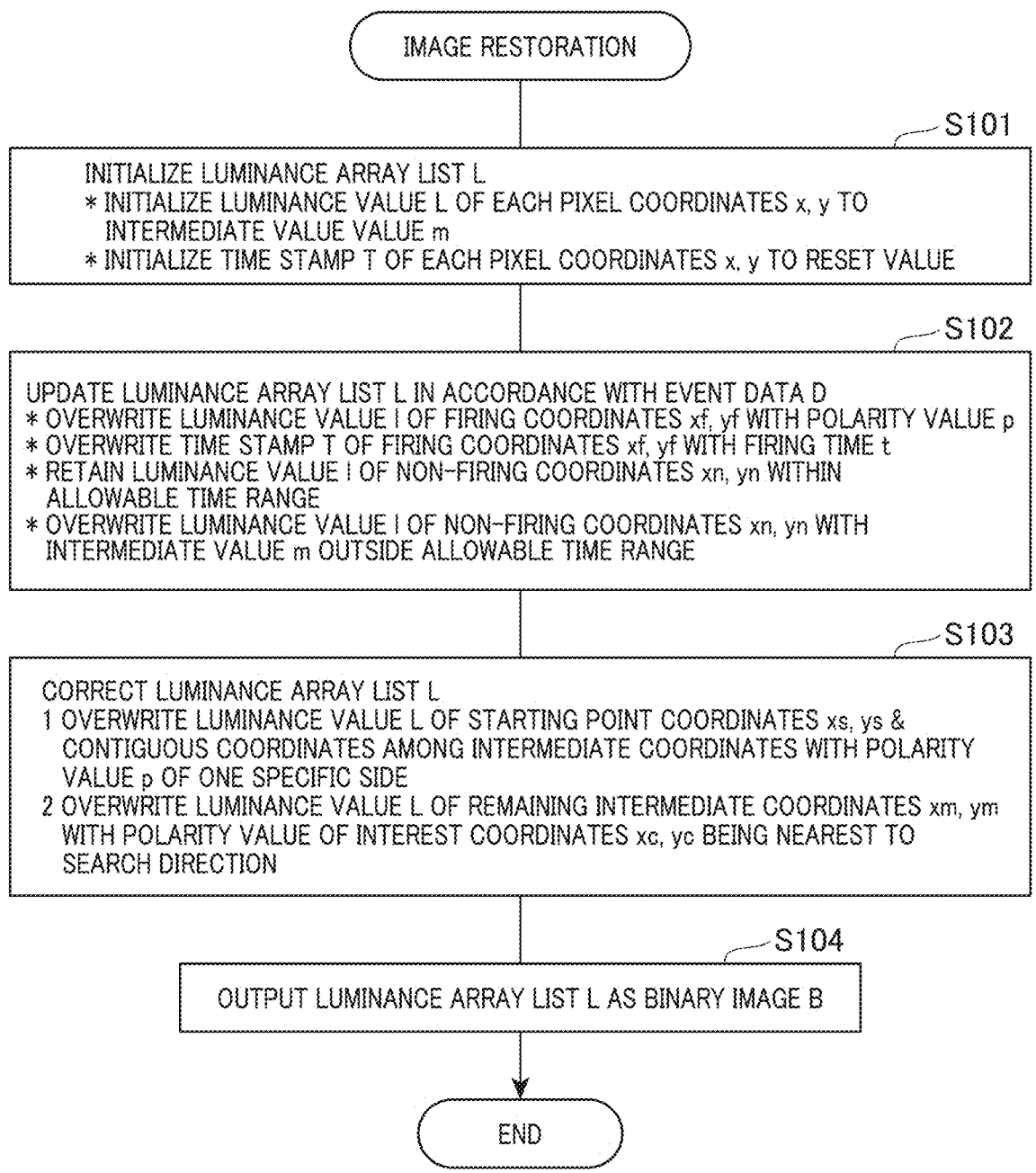
FIG. 12 Flowchart showing the image restoration method according to the first embodiment.

The image restoration flow, which is the flow of the image restoration method for the image restoration device 3 to restore the binary image B by the joint use of the blocks 100, 120, 140, 160, will be described according to FIG. 12. This image restoration flow is started before or upon the start of the shooting period by the event camera 2. In this image restoration flow, "S" refers to the multiple steps of the flow executed by the multiple instructions contained in the image restoration program.

In the step S101, the initialization block 100 initializes the luminance array list L prepared in the memory 10. At this time, the initialization block 100 initializes the luminance value 1 of each pixel coordinate x, y in the luminance array list L and the time stamp T to the intermediate value m and the reset value, respectively.

In the step S102 which is the following step of the step S101, the update block 120 updates the luminance array list L initialized by the step S101 in accordance with the event data D for each event. At this time, as an update process for each event, the update block 120 overwrites the luminance value 1 of the firing coordinates xf, yf in the luminance array list L and the time stamp T with the polarity value p and the firing time t of the event, respectively. At the same time, as an event-by-event update process, the update block 120 overwrites the luminance value I of the non-firing coordinates xn, yn in the luminance array list L, where the time difference between the firing time t and the time stamp T is outside the allowable time range, with the intermediate value m. As a result, in the luminance array list L, the luminance value I of the non-firing coordinates xn and yn, which have switched from xf and yf, will be overwritten by the intermediate value m outside the allowable time range from the firing time t.

Furthermore, while these overwrite operations are being performed, the update block 120 of the step S102, as an event-by-event update process, retains the luminance values 1 of the non-firing coordinates xn, yn in the luminance array list L for which the time difference between the firing time t and the time stamp T is within the allowable time range. As a result, the luminance values 1 of the non-firing coordinates xn, yn that have been switched from the firing coordinates xf, yf in the luminance array list L are retained within the allowable time range from the firing time t of the coordinates xf, yf before the switch.

In the stop S103 which is the following step of the step S102, the correction block 140 corrects the luminance array list L, which has been updated by the update block 120 according to the event data D of all events over the shooting period. At this time, as the first sub-correction process, the correction block 140 overwrites the luminance value 1 of the starting point coordinates xs, ys of the edge part and the luminance value 1 of the coordinates contiguous to the starting point coordinates xs, ys of the edge part among the intermediate coordinates xm, ym where the intermediate value m is stored in the luminance array list L after the entire update by the polarity value p of one specific side. As described above, this first sub-correction process is the main process. As the second sub-correction process, the correction block 140 overwrites the luminance values I of the remaining coordinates that remain as the intermediate values m among the intermediate coordinates xm and ym in the luminance array list L after the first sub-correction process, by using the polarity values p of the coordinates of interest xc and yc that are nearest to the search direction S from the remaining coordinates xm and ym. In this case, the search direction S is set to the direction of motion M of the black-and-white subject 4 relative to the event camera 2. This second sub-correction process can improve the processing speed.

In the step S104 which is the following step of the step S103, the output block 160 outputs the luminance array list L, which has been corrected by the correction block 140 after being updated over the shooting period by the step S102, as a binary image B. The image restoration flow for a single shooting period is completed by these steps.

From the description so far, in the first embodiment, the step S101 corresponds to the "initialization process" and the step S102 corresponds to the "update process". Also, in the first embodiment, the step S103 corresponds to the "correction process" and the step S104 corresponds to the "output process".

(Effectiveness)

The effects of the first embodiment described above are described below.

According to the first embodiment, for the luminance array list L in which the luminance value 1 of each pixel coordinate x, y is initialized to an intermediate value m, the update according to the pixel coordinates x, y and polarity value p for each event is calculated by overwriting the luminance value I of the firing coordinates xf, yf by the polarity value p of the event. The polarity value p, which is overwritten to the luminance value 1 at this time, can represent the actual luminance of the firing part (i.e., the luminance change part that gives a luminance change) that causes an event to fire in the camera pixel by relative movement among the photographed surfaces 40 of the black-and-white subject 4. According to the first embodiment, the update to the initialized luminance array list L retains the luminance values 1 of the non-firing coordinates xn, yn, excluding the firing coordinates xf, yf, while such overwriting operation is performed. As a result, the polarity values p retained in the non-firing coordinates xn, yn, which are switched from the firing coordinates xf, yf after the overwriting operation of the polarity values p, can represent the actual luminance of the non-firing portions of the photographing surface 40 that do not fire events even by relative movement.

Based on the above, the luminance array list L updated over the shooting period by the first embodiment can be output as a binary image B in which polarity values p corresponding to the actual luminance are stored in each pixel coordinates x and y corresponding to the shooting surface 40, respectively. According to the above, the binary image B can be restored by a simple arithmetic process of overwriting operation, thus reducing the arithmetic load required for image restoration.

According to the first embodiment, the luminance values 1 of the intermediate coordinates xm, ym where the intermediate values m are stored in the luminance array list L updated over the shooting period are overwritten with the polarity values p of the attention coordinates xc, yc that are nearest to the search direction S from the intermediate coordinates xm, ym. According to the fact that the search direction S is set in the direction M of relative motion of the black-and-white subject 4 to the event camera 2, the polarity value p, which is more likely to represent the actual luminance of the image surface 40 in the direction M, can be restored by replacing the intermediate value m. Therefore, it is possible to suppress the restoration failure of the binary image B caused by the remaining intermediate value m.

According to the first embodiment, the luminance values I of the non-firing coordinates xn, yn, which have been switched from the firing coordinates xf, yf in the luminance array list L, are the same as those of the pre-switching coordinates xf, yf. As a result, the polarity value p held in the non-firing coordinates xn and yn that are switched from the firing coordinates xf and yf within the allowable time range is the polarity value p held in the relative movement of the surface to be photographed after the event fires. As a result, the polarity value p held at the non-fire coordinates xn, yn, which are switched from the fire coordinates xf, yf, within the allowable time range, can represent the actual luminance of the non-fire portion of the photographing surface 40, which does not become event-ignited by the relative movement after the event-ignition. Therefore, the restoration of the binary image B in the non-firing portion, which conventionally requires the estimation of optical flow, can be realized by simple arithmetic processing, thereby reducing the arithmetic load.

According to the first embodiment, the luminance values I of the non-firing coordinates xn, yn, which have been switched from the firing coordinates xf, yf in the luminance array list L, are the same as those of the pre-switching coordinates xf, yf. In the case of a noise-induced event ignition, even if the luminance value 1 is overwritten by the wrong polarity value p at the ignition coordinates xf, yf, outside the allowable time range from the ignition time t, the initial intermediate value m will be overwritten. As a result, even if the luminance value I is overwritten by the wrong polarity value p at the firing coordinates xf, yf in the case of event firing due to noise, the luminance value 1 can be returned to the normal intermediate value m because the subsequent event firing does not occur until outside the allowable time range. Therefore, it is possible to suppress the restoration failure of the binary image B caused by noise.

According to the first embodiment, the direction of the optical flow generated within the shooting period by the relative motion to the event camera 2 is the same in the entire area of the surface 40 to be shot by the event camera 2. This makes it difficult for the polarity value p of the non-firing coordinates xn and yn, which are switched from the firing coordinates xf and yf after the overwriting of the polarity value p, to deviate from the actual luminance of the non-firing portion. Therefore, it is possible to restore the binary image B by a simple calculation process.

B/W 2D. In the first embodiment of image restoration using the two dimensional code in motion relative to the event camera 2 during the shooting period as a subject 4, the polarity value p of the non-firing coordinates xn, yn switched from the firing coordinates xf, yf after the overwriting calculation of the polarity value p can accurately represent the actual luminance of the non-firing part. Therefore, it is possible to recover the binary image B with high accuracy even with a simple arithmetic process.

The first embodiment described above will be explained again from a different perspective. The black-and-white subject 4, which is the reading target of this disclosure, is not limited to QR Code (registered trademark of Denso Wave Inc.), which is a kind of binary code, as described above, but can be any other kind of two-dimensional code, and furthermore, can be a barcode, which is a one-dimensional code. Usually, the black and white subject is printed in white and black, but it can have colors as long as they are light and dark. Therefore, white and black, as used in the following explanation, mean light and dark colors.

In the case of a QR code, as shown in FIGS. 1-3, the code has a rectangular finding pattern 4a at the three corners of the code, and the inside of the code has rectangular white cells and rectangular black cells, and the information is determined by the arrangement of these cells. The width of the outermost square black section of the finding pattern 4a is the same as the width of the cell, the width of the inner square white section is also the same as the width of the cell, and the width of the center square black section is three times the width of the cell. In any case, the printed Q R code is a combination of white or black squares.

FIG. 4 shows an image of a QR Code restored by the image restoration device 3. In the printed state, the QR Code is not deformed as shown in FIG. 4. However, even a restored QR Code as shown in FIG. 4 can be read. Since QR Code judges the brightness (white or black) at the center of each cell, it is possible to read the information even if the QR Code is restored as shown in FIG. 4.

The event camera 2 has a large number of camera pixels (hereinafter referred to as pixels) as shown in the luminance array list L in FIG. 9. In the examples of FIGS. 6 to 8, the event camera 2 has, for example, 1280 pixels (x: 1 to 1280) in the horizontal direction and 720 pixels (y: 1 to 720) in the vertical direction. Though the surface 40 to be photographed, shown in FIG. 3, varies with the distance between the event camera 2 and the black-and-white subject 4, the surface is usually a sufficiently large area compared to the black-and-white subject 4 (QR code). For this reason, only a part of the surface to be photographed is shown in FIG. 3. As an example of the size of the surface to be photographed and the size of the black-and-white object 4 (QR code), the image in FIG. 11 is easy to understand. For example, if the size of the surface to be photographed is 128 mm in the horizontal direction and 72 mm in the vertical direction, then 0.01 mm square of the surface to be photographed corresponds to one pixel of the event camera 2.

As shown in FIG. 5, the event camera 2 is designed to detect changes in luminance (brightness) when they occur and to record the pixel coordinate x, y, the polarity value p which is the change of the brightness and the time t of ignite as event data D. Therefore, if there is no ignition, the event camera 2 does not record anything new. On the other hand, if there is a fire (ignition), the fire is recorded at an extremely short timing. Depending on the performance of the event camera 2, it may be possible to record even one microsecond (one millionth of a second).

In the example in FIG. 5, it is recorded that an event (ignition) with a polarity value p changing to 1 at a pixel with an x-coordinate of 1 and a y-coordinate of Y−1 (719 in the 720 pixel example) occurred in a time of 0.5 milliseconds (0.5 thousandths of a second). It is also recorded that, at a time of 0.7 milliseconds, firing with a polarity value of p changing to 0 is recorded for pixels with an x-coordinate of 2 and a y-coordinate of Y−1 (719), and at a time of 1 millisecond, firing with the polarity value p changing to 1 is recorded in pixels with an x-coordinate of 2 and a y-coordinate of Y−1 (719).

Note that the event camera 2 does not detect the absolute value of luminance (brightness) but detects changes in luminance (brightness). As mentioned above, the amount of luminance change is detected in the order of log. For example, if luminance (brightness) is decomposed into 128 between black (0) and white (1), and the threshold for detecting the change is set to 10/128, the polarity value p of "1" is recorded when the brightness becomes brighter than 10/128 from the brightness before the change, and the polarity value p of "0" is recorded when the brightness becomes darker than 10/128. When the brightness becomes darker than 10/128, the polarity value p of "0" is recorded. In the example, the absolute value of luminance (brightness) is 0.5 before the change and 0.3 after the change. The polarity value p of "0" is recorded because it is darker than the threshold value of "0". However, if the absolute value of luminance (brightness) is 0 before the change and 0.3 after the change, the polarity value p of "1" is recorded because the brightness is brighter than the threshold value. In other words, even if the absolute value of luminance (brightness) is also 0.3, the polarity value p to be recorded can be "0" or "1".

In relation to FIG. 5 and FIG. 6, FIG. 6 shows the luminance array list L at a time of 1 millisecond. The time is still remained as "0 milliseconds" because no luminance (brightness) change (firing) has occurred in pixels other than the three pixels with an x coordinate of 1 and a y coordinate of Y−1 (719), pixels with an x coordinate of X (1280) and a y coordinate of Y−1 (719), and pixels with an x coordinate of 2 and a y coordinate of Y−1 (719). Since pixels with x-coordinate 1 and y-coordinate Y−1 (719) and with x-coordinate X (1280) and y-coordinate Y−1 (719) have changed the luminance (firing) at 0.5 milliseconds, "0.5 milliseconds" of the time stamp and "1" and "0" of the polarity value p are recorded. In the case of the pixel with the x-coordinate of 2 and the y-coordinate of Y−1 (719), the luminance (brightness) change (firing) occurred twice, first one at a time of 0.7 milliseconds and second one at a time of 1 millisecond, so that each of the time stamp T are recorded in FIG. 5. In the example of FIG. 6, which shows the 1 millisecond state, the polarity value p of "1" and the time stamp T of "1 millisecond" are recorded.

As described above, the event camera 2 detects changes in brightness (luminosity), so if there is no change, nothing is detected. Therefore, nothing is detected if the black and white subject 4 (QR code) does not move but stays. Event data D is recorded only when the black-and-white subject 4 (QR Code) is moving.

In the above hypothetical example, where the size of the imaging surface 40 is 128 mm in the horizontal direction and 72 mm in the vertical direction, and the width of the white and black square cells of the event camera 2 is 1 mm, then one cell of the black and white subject 4 (QR code) corresponds to 100 pixels of the event camera 2. This means that if the surface to be photographed, which receives light in one pixel, is shown as a square, one side is 0.1 mm. And if the black-and-white subject 4 (QR code) moves 10 centimeters per 1 second, for example, this means that the edge of the cell of the black-and-white object 4 (QR code) moves in the relative motion direction M by 1000 pixels per second. In other words, the edge of the cell of the black-and-white object 4 (QR code) moves in the relative motion direction M by 1000 pixels per second, which means that the edge of the cell of the black-and-white object 4 (QR code) passes by in one millisecond per pixel.

The "edge of the cell of the black-and-white subject 4 (QR Code)" means the boundary between the white cell and the black cell. In terms of the white cell, there is a boundary where the black cell ends and the white cell begins, and a boundary where the white cell ends and the black cell begins. Similarly, in terms of black cells, the start and end portions are the boundary portions.

If the resolution of the event camera 2 is set to 0.1 millisecond (0.1 thousandth of a second), 10 changes in luminance (brightness) can be recorded when the edge of a cell of a black-and-white object 4 (QR code) passes through one pixel. For example, if a cell with the initial brightness is black (brightness value 0) moves to a cell with white (brightness value 1), and if the event camera 2 positions where all of these changes in brightness (luminosity) can be observed, then the pixel at that coordinate would be able to detect the change in luminance (brightness) 10 times, from the time when all areas showed the black cells of the black-and-white object 4 (QR code) (time 0 milliseconds) to the time when all areas showed the white cells of the black-and-white object 4 (QR code) (time 1 millisecond).

Therefore, in this example, one pixel of event camera 2 detects a change from the state where the entire pixel is black (brightness value 0) (time 0 milliseconds) to the state where the entire pixel is white (brightness value 1) (time 1 millisecond) 10 times. Since these 10 times (from time 0 milliseconds to time 1 millisecond) are above the threshold, the coordinates x, y of the specific pixel, the polarity value p of "1" and the ignition time t are recoded in the event data D.

With the above assumptions, if one edge of a cell in a black-and-white object 4 (QR code) corresponds to 10 pixels of the event camera 2 and if the 10 pixels are continuous in the relative motion direction M, then the first pixel and the last pixel correspond to the edges of the cell in the black-and-white object 4 (QR code), the first and last 10 pixels correspond to the edge of the cell of the black-and-white object 4 (QR code) can detect the black-and-white inversion. On the other hand, the second to ninth pixels do not correspond to the edge of the cell of the black-and-white object 4 (QR code), and no black-and-white inversion occurs. In this case, no event data D is recorded in the second to ninth pixels. The last tenth pixel transits from a white (luminance value 1) cell to a black (luminance value 0) cell, so there is a luminance (brightness) change of more than a threshold value, and, therefore, the coordinates x, y, polarity value p of "0" and firing time t are recorded.

In other words, at the edge of the cell where the black and white of the black and white subject 4 (QR code) is inverted, a change in luminance (brightness) of more than a threshold value is detected and a polarity value p of "1", which means that the luminance (brightness) has changed more than a threshold value in the bright direction, or a polarity value p of "0", which means that the luminance (brightness) has changed more than a threshold value in the dark direction, is recorded. 0" is recorded, but in the middle part of the cell where white or black is continuous, there is no change in luminance (brightness), so it is not recorded.

The above explanation is based on the assumption that the black-and-white object 4 (QR Code) has only one cell that changes from a white cell to a black cell, but in actual black-and-white objects 4 (QR Code), it is normal to have multiple white and black cells in succession. Therefore, fewer pixels are actually detected at the edge of the cell of the black-and-white subject 4 (QR code).

This is very important for detecting black and white objects 4 (QR codes) from the surface 40 to be photographed. A black-and-white object 4 (QR code) has a white or black cell with no intermediate colors, but other parts of the object where the black-and-white object 4 (QR code) are not existed, the brightness (luminance) changes randomly. Therefore, it is rare that white (brightness value 1) or black (brightness value 0) is maintained for several milliseconds.

Based on the above technical matters, the imaging system 1 of the present disclosure will be described. As shown in FIGS. 1 and 2, the event camera 2 captures a black-and-white subject 4 (QR code) to be photographed which is moving in a certain relative motion direction M, for example, at a speed of 10 centimeters per second. Of course, the speed of 10 centimeters is an example, and faster movement is possible. What is more important is not the physical speed of the black-and-white object 4 (QR code), but the change in the viewing angle as seen from the event camera 2. The closer the distance between the event camera 2 and the black-and-white object 4, the faster the movement can be detected.

When the event camera 2 detects a change in brightness (luminosity), it outputs event data D corresponding to the change to the image restoration device 3. The event data D includes, as shown in FIG. 5, the coordinates x, y of the pixel where the event occurred, the polarity value p (0, 1) at which a change in luminance (brightness) greater than a threshold occurred, and the ignition time t (time stamp T) at which the event occurred are recorded.

As mentioned above, FIG. 1 shows the hardware of the image restoration device 3, wherein the memory 10 and the processor 12 are connected by a bus. FIG. 2 shows the functional blocks of the software of the image restoration device 3, including the initialization block 100, the update block 120, the correction block 140, and the output block 160. The above mentioned event data D is recorded in memory 10. FIG. 6 shows an example of recording the event data D shown in FIG. 5. In the luminance array list L of the memory 10, the coordinates x, y of the pixels of the event camera 2, the luminance (brightness) above a threshold, the polarity value p (0, 1) at which the change in the event occurred and the ignition time t (timestamp T) at which the event occurred are recorded.

The initialization block 100 initializes the data in the memory 10. Initialization means that the time stamp T becomes "0" at every coordinates x, y of the pixel. If the resolution of the event camera 2 is, for example, 0.1 milliseconds, then the time stamp T of 0 means 0 millisecond. Initialization also means that the luminance value 1 is set to an intermediate value m that is neither "0" nor "1" at the coordinates x, y of all pixels of the event camera 2. In this example, "0.5" is used as the intermediate value m. An example of the initialized luminance array list L of memory 10 is shown in FIG. 7. At the coordinates x, y of all pixels of the event camera 2, the luminance value I is "0.5" and the time stamp T is "0". The operation performed in this initialization block 100 corresponds to step S101 of the flowchart in FIG. 12.

The update block 120 acquires event data D from the event camera 2 and overwrites (updates) the data in the memory 10. For example, when the event data D in FIG. 5 is acquired, the luminance array list L in the memory 10 is updated as shown in FIG. 8 with a time of 0.5 milliseconds, and as shown in FIG. 6 with a time of 1 millisecond. When the time is 0.5 milliseconds (FIG. 8), the ignition has not yet occurred and, therefore, the luminance value 1 is "0.5" and the time stamp T is "0 milliseconds" at the pixel of x-coordinate is 2 and y-coordinate is Y–1.

In FIGS. 5, 6, and 8, the events occur at the edge of the luminance array list L ((x=1, y=Y–1), (x=2, y=Y–1), (x=X, y=Y–1)), which means that the black-and-white subject 4 is moving from the edge of the field of view of the event camera 2. If the black-and-white subject 4 is a QR code, the QR code must enter the field of view of the event camera 2 by a predetermined amount or more in order to be decoded.

In the example of FIG. 9, the firing coordinates xf, yf are the pixels indicated by black (luminance value 1: "0") or white (luminance value 1. "1"). The operation performed in this update block 120 corresponds to the step S102 of the flowchart in FIG. 12.

The correction block 140 detects the black and white subject 4 (QR code) from event data D. In addition to the first sub-correction process, which is the main process, the second sub-correction process is performed to quickly extract the luminance array list (L) of memory 10, and the correction is performed twice in total. As described above, since the black-and-white subject 4 (QR code) consists only of white and black cells and has no intermediate colors, the pixels of the event camera 2 detect the black-and-white inversion at the edges of the cells and do not detect the black-and-white inversion in the areas other than the edges. Since the cell of the black-and-white subject 4 (QR code) is printed as a straight line, the firing coordinates xf, yf by the edge of the cell of the black-and-white subject 4 (QR code) will be a white or black straight line. In the example in FIG. 9, the black and white lines are the firing coordinates xf, yf. Therefore, in the first sub-correction process, a white line and a black line are detected from the firing coordinates xf and yf.

In FIG. 9, the firing coordinates xf, yf on the lower left part of the black vertical line and horizontal line are illustrated as white. This white portion does not show the actual firing coordinates xf and yf, but indicates the moving direction of the black and white subject 4 (QR code). The shooting time depends on the number of pixels, the size of the cell of the black-and-white subject 4 (QR code), the direction of relative motion M and the speed of relative motion, but should be within a predetermined acceptable time range. In the example in FIG. 9, the width of the white and black lines in the black-and-white subject 4 (QR code) corresponds to the predetermined allowable time range.

In FIG. 9, intermediate coordinates xm and ym with a luminance value I of "0.5" are used as the non-firing coordinates xn and yn where no firing is occurring in areas other than the black-and-white subject 4 (QR code), except for the white area described above, but in reality, not only the black-and-white subject 4 (QR code) but also the other parts on which the black-and-white subject 4 (QR code) is not printed moves relative to the camera. Therefore, even in areas other than the black-and-white subject 4 (QR code), the firing coordinates are usually xf, yf at the position where the object, such as the other part, moves. However, in areas other than the black-and-white object 4 (QR code), changes in luminance (brightness) are random, and a linear arrangement of pixels detecting changes in luminance (brightness) in the light or dark direction does not usually occur. In areas where objects do not move, there is no change in luminance (brightness), so the luminance value I remains at the intermediate coordinates xm, ym of "0.5".

With the first sub-correction process described above, the edge of the cell of the black-and-white subject 4 (QR code) can be identified. Then, the non-firing coordinates xn, yn, which exist as intermediate coordinates xm, ym with a luminance value I of "0.5", within the range where this black-and-white object 4 (QR code) exists, are the areas where no black-and-white inversion has occurred, but the actual cells of the QR code are existed. The second sub-correction process in this example is a correction process in which these intermediate coordinates xm, ym with a luminance value I of "0.5" are made into firing coordinates xf, yf with a luminance value I of "1" or "0". The coordinates where the luminance value I changes from "1" to "0.5" or from "0" to "0.5" in the direction of relative motion M are designated as the attention coordinates xc and yc, and the firing coordinates xf and yf are made to be the same luminance value I from the attention coordinates xc and yc in the relative motion direction M and in the opposite direction O.

For example, from the attention coordinates xc, yc, which follow from the coordinate where the change in luminance (brightness) fires to "0" of black luminance value 1 in the dark direction, the same luminance value 1 is replaced by "0" in the relative motion direction M and reverse direction O. In the example of FIG. 10, from the left side attention coordinates xc, yc, the gray is replaced with black in the relative motion direction M and reverse direction O. Also, from the right side attention coordinates xc, yc, in the direction O opposite to the relative motion direction M, gray is replaced with white. As a result, the cells of the QR Code are output as their original white or black color.

FIG. 11 shows a black-and-white subject 4 (QR code) with the second sub-correction process. As described above, the first sub-correction process, which is the main process, detects the edges of the QR code cells, so that no first sub-correction process has performed on the other area than the black-and-white subject 4 (QR code) exists. The second sub-correction process is also performed in the area where the black-and-white subject 4 (QR code) exists. Since the second sub-correction process is performed only in the area judged to be the area of the black-and-white subject 4 (QR code) by the first sub-correction process, this second sub-correction process is also not performed in the area where the black-and-white subject 4 (QR code) does not exist. Therefore, in areas other than the black-and-white subject 4 (QR code) in FIG. 11, the change in luminance (brightness) remains as it is, and white pixels (luminance value I is "1") and black pixels (luminance value I is "0") are displayed as randomly locating.

In order to be able to grasp the black-and-white object 4 (QR code) more accurately within the field of view of the event camera 2, as shown in FIG. 11, such randomly locating pixels are eliminated and the process of displaying in white color is performed. Similarly, in areas where objects such as assembling parts do not move, intermediate coordinates xm and ym with a luminance value I of "0.5" remain, but the intermediate coordinates xm and ym of such areas are also processed to be displayed in white. The line extending downward to the left from the black-and-white subject 4 (QR code) in FIG. 11 merely indicates the relative motion direction M of the black-and-white subject 4 (QR code), and is not a line obtained by the second sub-correction process, nor does it indicate the shooting time.

The first and second sub-correction processes described above are performed in the correction block 140. This operation in the correction block 140 is the step S103 of the flowchart in FIG. 12.

The output block 160 outputs the corrected image as shown in FIG. 11. As described above, in the area where the black-and-white subject 4 (QR code) exists, white cells and black cells are displayed. In the area where the black-and-white subject 4 (QR code) does not exist, white (luminance value I is "1") pixels and black (luminance value I is "0") pixels are randomly displayed. The white color is defined as the area where pixels do not change their luminance. In any case, since there are no intermediate coordinates xm, ym with a luminance value 1 of "0.5", binary image B is output. This operation in the output block 160 corresponds to the step S104 in the flowchart of FIG. 12. In the example of FIG. 11, the areas other than the black-and-white subject 4 (QR code) are corrected to white, but the color can be black or any other color such as green, as long as the black-and-white is easily grasped.

The information contained in the black-and-white object 4 (QR code) is then decoded from the output binary image B. Since the black-and-white object 4 (QR code) has a finding pattern 4a in three corner locations, it is software-oriented and easy to detect the specially shaped finding pattern 4a from among the randomly existing white (luminance value I is "1") and black (luminance value I is "0") pixels. When the location of the finding pattern 4a is found, the brightness at the center of the cell of the black-and-white subject 4 (QR Code) is defined whether the color is black (luminance value I is "0") or white (luminance value I is "1"). The information encoded in the black and white subject 4 (QR code) can be decoded.

In particular, in the present disclosure, the first sub-correction process is used to define the area where a black-and-white subject 4 (QR code exists. Since the second sub-correction process is performed in the area where the QR Code is located, the black-and-white subject 4 (QR Code) can be restored before all of the black-and-white subject 4 (QR Code) is actually read (after reading the minimum two pixels). And since the restored information is a binary image B, there is no need to perform the binarization process again. Therefore, according to the present disclosure, it is possible to read out the information of a black-and-white subject 4 (QR code) during an extremely short shooting time (minimum 1 microsecond).

In the case if it is possible to take some time to grasp the black-and-white subject 4 (QR code), it is also possible to detect the cells of the black-and-white subject 4 (QR code) using only the first sub-correction process without the second sub-correction process. In other words, the thickness of the straight line in the examples of FIG. 9 and FIG. 10 corresponds to the allowable time range. By lengthening this allowable time range, it is possible to make the entire cell of the black-and-white subject 4 (QR code) white or black. In this sense, the first sub-correction process is the main process.

Second Embodiment

Figure 13:
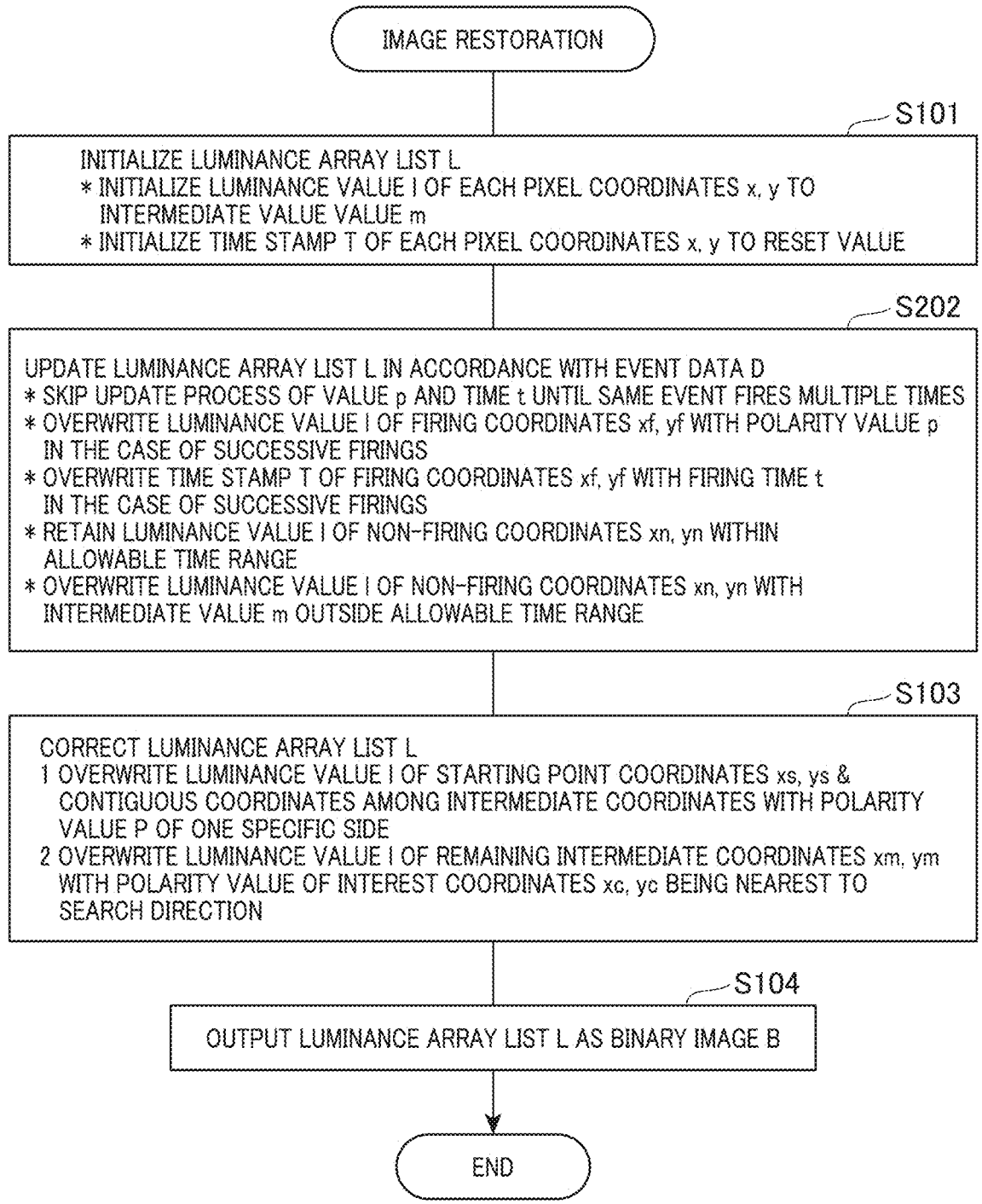
FIG. 13 Flowchart showing the image restoration method according to the second embodiment.

The second embodiment is a variation of the first embodiment as shown in FIG. 13.

The image restoration flow according to the second embodiment performs the step S202 instead of the step S102. In this step S202, the update block 120 updates part of the luminance array list L according to the event data D for each event until the same event with firing coordinates xf, yf and polarity value p fires multiple times in succession. In this step S202, the update block 120 skips the partial update process of the luminance array list L according to the event data D for each event until the same event with the firing coordinates xf, yf and polarity value p fires multiple times in succession. The partial update process to be skipped at this time is an overwrite operation using the polarity value p and the firing time t. Therefore, the update block 120 overwrites the luminance value 1 of the firing coordinates xf, yf in the luminance array list L with the same polarity value p in the case of successive firings of the same event with the firing coordinates xf, yf and polarity value p. At the same time, the update block 120 overwrites the luminance value 1 of the firing coordinates xf and yf in the luminance array list L with the same polarity value p. The time stamp T of the firing coordinates xf, yf in the luminance array list L is overwritten the calculation by the firing time t of the last event in the sequence of firings.

In such step S202, the number of consecutive events for which the update process is skipped by the update block 120 is set to an appropriate number that can suppress errors in overwriting the polarity value p caused by noise firing, such as disturbances, for example. In addition, the update process by the update block 120 in the step S202 is performed in the same manner as in the first embodiment, except for the overwriting operation of the polarity value p and the firing time t. In such a second embodiment, the step S202 corresponds to the "update process".

(Effectiveness)

The effects of the second embodiment described above are explained hereinafter.

According to the second embodiment, the update of the luminance array list L is skipped until the same event with firing coordinates xf, yf and polarity value p fires multiple times in succession. In this way, it is possible to suppress poor recovery of the binary image B due to errors in overwriting the polarity value p caused by noise firing.

This second embodiment will also be explained again from a different perspective. In the first embodiment, the change in luminance (brightness) was captured mainly at the edges of a black-and-white subject 4 (QR code), and it was assumed that white or black color was continuous and no change in luminance (brightness) occurred in areas other than the edges. This assumption is, of course, correct, but it cannot be denied the occurrence of noise caused by external disturbances.

For example, in the white portion of the cell of a black-and-white subject 4 (QR code), the possibility cannot be excluded that a decrease in luminance (brightness) of more than a threshold value is detected in one of the pixels due to changes in external light, dirt, etc. Furthermore, even if there is no change in light, there is a possibility that external noise from the outside may get on the constant-voltage analog output signal from the event camera 2. In this case, the pixel where a decrease in luminance (brightness) is detected or noise is introduced is recorded in the event data D with its coordinates x, y, polarity value p "0" and the time of ignition t (time stamp T). As a result, in the luminance array list L in memory 10, the coordinates of the pixel in question become the firing coordinates xf, yf, and the luminance value I also becomes "0".

However, the coordinates of such pixels should be non-firing coordinates xn, yn, since there is originally no change in luminance (brightness) and the white portion of the cell of the black-and-white subject 4 (QR code) should continue, and the luminance value 1 should be intermediate coordinates xm, ym, which indicates an intermediate value m of "0.5". If such incorrect information is recorded in the luminance array list L of memory 10, it is necessary to perform filter processing to remove noise in the first and second correction processes in the correction block 140, which increases the processing time and causes misjudgments.

Likewise, it is unlikely that such noise will be detected in the same pixel many times in a row. This is because the white part of the cell of the black-and-white object 4 (QR code) is supposed to be the place where the decrease in brightness (luminosity) continues, not the place where the decrease in brightness (luminosity) continues. On the other hand, at the edge of a cell of a black-and-white subject 4 (QR code), a given pixel can detect changes in luminance (brightness) for multiple times.

Therefore, pixels with multiple consecutive changes in luminance (brightness) are most likely to be detecting the edge of the cell of the black-and-white subject 4 (QR code). On the other hand, pixels with a single change in luminance (brightness) are likely to be incorrectly detecting a luminance change that has not originally occurred, or being affected by external noise.

The second embodiment takes advantage of this property. Even if a change in luminance (brightness) occurs at a specific pixel (specific coordinate), the luminance array list L of the memory 10 is not updated in the update block 120 unless there are multiple consecutive polarity values p in the same direction ("0" or "1"). This is the step S202 of the flowchart in FIG. 13.

In this way, the luminance value I is "0" or "1" in the luminance array list L of memory 10 only as the result of multiple consecutive events, so that the luminance array list L is highly reliable. Therefore, the correction block 140 can perform the first and second sub-correction processes using highly accurate information, and the filtering process can be eliminated or reduced.

As a result, processing time can be shortened and decoding errors can be reduced.

The number of successive plural times is to be determined according to the number of pixels of the event camera 2, the area of the surface 40 to be photographed, the size of the cell of the black-and-white subject 4 (QR code), the speed of movement of the black-and-white subject 4 (QR code) in the relative motion direction M, and other factors. For example, it is preferable that the number of consecutive plural times be sufficient to detect the luminance change caused by the edge of the black-and-white subject 4 (QR code).

The present disclosure is not to be construed as limited to those embodiments, but may be applied to various embodiments and combinations within the scope not departing from the gist of the present disclosure.

The image restoration device 3 of the variant example may be a dedicated computer, comprising at least one of digital circuits and analog circuits as a processor. Here, digital circuit in particular means, for example, ASIC (Application Specific Integrated Circuit), FPGA (Field Programmable Gate Array), SOC (System on a Chip), PGA (Programmable Gate Array) and CPLD (Complex Programmable Logic Device), etc. These digital circuits may also have memory to store programs. These digital circuits may also be equipped with a memory that stores the program.

In a modified embodiment, in the update block 120 and the update process of the step S102, the luminance values 1 of the non-firing coordinates xn, yn in the luminance array list L may be retained regardless of the time difference between the firing time t and the time stamp T. In a modified embodiment, the correction block 140 and the second sub-correction process of the step S103 may be skipped or always omitted if necessary.

In a modified embodiment, the direction of the optical flow generated within a shooting period by the relative motion to the event camera 2 may be different in a part of the surface 40 to be photographed by the event camera 2. In this case, in the second sub-correction process of the correction block 140 and the step S103, for example, by basing on the direction M of the relative motion of the black-and-white subject 4 relative to the event camera 2, errors in the luminance values 1 caused by the different direction of some of the optical flows are corrected for the luminance array list L.

In a variant example, a black-and-white subject 4 other than a planar two-dimensional code that is in motion relative to the event camera 2 within a shooting period may be the target of restoration of the binary image B. Specifically, the binary image B may be restored based on the event data D output by the event camera 2 mounted on a moving object such as a vehicle, for example, which photographs the black-and-white objects 4 existing around the moving object.

EXPLANATION OF THE NUMERAL 2 event camera, 3 image restoration device, 4 black-and-white object, 10 memory, 12 processor, 40 imaging surface, 100 initialization block, 120 update block, 140 correction block, 160 output block, B binary image, D event data, 1 luminance value, L luminance array list, S search direction, T timestamp, m intermediate value, p polarity value, t ignition time, x, y pixel coordinates, xc, yc attention coordinates, xf, yf ignition coordinates, xm, ym intermediate coordinates, xn, yn non-ignition coordinates

The invention claimed is:

1. An image restoration device for recovering a binary image based on pixel coordinates and polarity values of an event which are output from an event camera capturing a black and white shooting object in relative motion within a shooting period and associated with an ignition time of the event in which luminance has changed in at least one camera pixel, the black and white shooting object being a binary code having a plurality of black cells and a plurality of white cells and having an edge as a boundary between each respective black cell and each respective white cell, wherein the image restoration device comprises:
   an initialization unit that initializes the luminance value of each pixel coordinate to an intermediate value within a luminance array list that stores at least one of a pair of polar values and the intermediate values as a luminance value for each pixel coordinate;

an update unit that updates the luminance array list initialized by the initialization unit according to the pixel coordinates and polarity values for each event; and an output unit that outputs the luminance array list updated by the update unit during the shooting period as a binary image, wherein an update by the update unit overwrites the luminance value of the firing coordinate, which is the pixel coordinate where the event has fired in the luminance array list, with the polarity value of the event, while retaining the luminance value of the non-firing coordinate within the luminance array list, and the update unit detects the edge of the black cell and the white cell of the binary code where the polarity value is inverted from the intermediate value to either one of the pair of the polar values so that the update unit detects the binary code using the edge.

2. The image restoration device according to claim 1, wherein the update by the update unit is skipped until occurrence of multiple consecutive firings of the same event and polarity value.

3. The image restoration device according to claim 1, wherein a direction of an optical flow is the same direction of the movement of the black and white shooting object relative to the event camera in the entire shooting area in the entire time length of the shooting period.

4. An image restoration device for recovering a binary image based on pixel coordinates and polarity values of an event which are output from an event camera capturing a black and white shooting object in relative motion within a shooting period and associated with an ignition time of the event in which luminance has changed in at least one camera pixel, wherein the image restoration device comprises:

an initialization unit that initializes the luminance value of each pixel coordinate to an intermediate value within a luminance array list that stores at least one of a pair of polar values and the intermediate values as a luminance value for each pixel coordinate;

an update unit that updates the luminance array list initialized by the initialization unit according to the pixel coordinates and polarity values for each event;

an output unit that outputs the luminance array list updated by the update unit during the shooting period as a binary image; and a correcting part for correcting the intermediate value of the brightness array list updated by the update unit during the shooting period, wherein an update by the update unit overwrites the luminance value of the firing coordinate, which is the pixel coordinate where the event has fired in the luminance array list, with the polarity value of the event, while retaining the luminance value of the non-firing coordinate within the luminance array list, the correcting part searches for the non-firing coordinate having the retained luminance of the intermediate in the brightness array list from the closest changed coordinate having the polarity value being the negative or the positive in the brightness array list in accordance with a searching direction which is the same direction of the movement of the black and white shooting object relative to the event camera, and the correcting part changes the polarity value of the non-firing coordinate to the same polarity value of the changed coordinate.

5. The image restoration device of claim 4, wherein the correcting part retains the polarity value of the intermediate of the brightness array list next to the changed coordinate of the brightness array list within a predetermined permitted time length and changes the polarity value of the non-firing coordinate to the same polarity value of the changed coordinate after the permitted time length.

6. The image restoration device according to claim 4, wherein the black and white shooting object moving relative to the event camera is a two dimensional code.

7. An image recovery method run by a processor for recovering a binary image from a captured information shot by an event camera, wherein the captured information is the information of a black and white shooting object which is moving during a shooting period of the event camera, wherein the captured information is the information of pixel coordinates, a polarity value and a time when the brightness of at least one pixel is changed, the black and white shooting object being a binary code having a plurality of black cells and a plurality of white cells and having an edge as a boundary between each respective black cell and each respective white cell, the image recovery method comprising:

an initializing process for initializing the brightness of a brightness array list having the pixel coordinates that the polarity value of negative, intermediate and positive is initialized to the polarity value of the intermediate;

an updating process for updating the brightness array list to change the polarity value to the negative or the positive of at least one pixel coordinate where the event of the brightness of at least one pixel changing has occurred at the at least one pixel coordinate and to keep the polarity value of at least one pixel coordinate where the event has not occurred; and an outputting process for outputting the binary image by using the brightness array list updated by the updating process during the shooting period, wherein the updating process detects the edge of the black cell and the white cell of the binary code where the polarity value is inverted from the intermediate value to either one of the pair of the polar values so that the updating process detects the binary code using the edge.

8. The image recovery method of claim 7, wherein the updating process retains the polarity value of the brightness array list until the same event of the brightness of at least one pixel changed has occurred at least a plurality of times.

9. The image recovery method of claim 7, wherein a direction of an optical flow is the same direction of the movement of the black and white shooting object relative to the event camera in the entire shooting area in the entire time length of the shooting period, and wherein processor recovers the binary image of the black and white shooting object.

10. An image recovery method run by a processor for recovering a binary image from a captured information shot by an event camera, wherein the captured information is the information of a black and white shooting object which is moving during a shooting period of the event camera, wherein the captured information is the information of pixel coordinates, a polarity value and a time when the brightness of at least one pixel is changed, the image recovery method comprising:

an initializing process for initializing the brightness of a brightness array list having the pixel coordinates that the polarity value of negative, intermediate and positive is initialized to the polarity value of the intermediate;

an updating process for updating the brightness array list to change the polarity value to the negative or the positive of at least one pixel coordinate where the event of the brightness of at least one pixel changing has occurred at the at least one pixel coordinate and to keep the polarity value of at least one pixel coordinate where the event has not occurred;

an outputting process for outputting the binary image by using the brightness array list updated by the updating process during the shooting period; and a correcting process for correcting the polar value of the intermediate of the brightness array list updated by the updating process during the shooting period, wherein the correcting process searches the at least one pixel coordinate where the event has not occurred for the polarity value being the intermediate in the brightness array list from the closest changed coordinate having the polarity value being the negative or the positive in the brightness array list in accordance with a searching direction which is the same direction of the movement of the black and white shooting object relative to the event camera, and the correcting part changes the polarity value of the at least one pixel coordinate where the event has not occurred to the same polarity value of the changed coordinate.

11. The image recovery method of claim 10, wherein the correcting process retains the polarity value of the intermediate of the brightness array list next to the changed coordinate of the brightness array list within a predetermined permitted time length and changes the polarity value of the at least one pixel coordinate where the event has not occurred to the same polarity value of the changed coordinate after the permitted time length.

12. The image recovery method of claim 10, wherein the black and white shooting object moving relative to the event camera during the shooting period is a two dimensional code, and the processor recovers the binary image.

13. A non-transitory computer-readable medium storing thereon an image recovery program for sending a commanding order to a processor that a binary image from a captured information shot by an event camera is recovered, wherein the captured information is the information of a black and white shooting object which is moving during a shooting period of the event camera, wherein the captured information is the information of pixel coordinates, a polarity value and a time when the brightness of at least one pixel is changed, the black and white shooting object being a binary code having a plurality of black cells and a plurality of white cells and having an edge as a boundary between each respective black cell and each respective white cell, wherein the commanding order comprises:

an initializing process for initializing the brightness of a brightness array list having the pixel coordinates that the polarity values of negative, intermediate and positive is initialized to the polarity value of the intermediate;

an updating process for updating the brightness array list to change the polarity value to the negative or the positive of at least one pixel coordinate where the event of the brightness of at least one pixel changing has occurred at the at least one pixel coordinate and to keep the polarity value of at least one pixel coordinate where the event has not occurred; and an outputting process for outputting the binary image by using the brightness array list updated by the updating process during the shooting period, wherein the updating process detects the edge of the black cell and the white cell of the binary code where the polarity value is inverted from the intermediate value to either one of the pair of the polar values so that the updating process detects the binary code using the edge.

14. The non-transitory computer-readable medium of claim 13, wherein the updating process retains the polarity value of the brightness array list until the same event of the brightness of at least one pixel changed has occurred at least a plurality of times.

15. The non-transitory computer-readable medium of claim 13, wherein a direction of an optical flow is the same direction of the movement of the black and white shooting object relative to the event camera in the entire shooting area in the entire time length of the shooting period, and the binary image of the black and white shooting object is recovered.

16. A non-transitory computer-readable medium storing thereon an image recovery program for sending a commanding order to a processor that a binary image from a captured information shot by an event camera is recovered, wherein the captured information is the information of a black and white shooting object which is moving during a shooting period of the event camera, wherein the captured information is the information of pixel coordinates, a polarity value and a time when the brightness of at least one pixel is changed, wherein the commanding order comprises:

an initializing process for initializing the brightness of a brightness array list having the pixel coordinates that the polarity values of negative, intermediate and positive is initialized to the polarity value of the intermediate;

an updating process for updating the brightness array list to change the polarity value to the negative or the positive of at least one pixel coordinate where the event of the brightness of at least one pixel changing has occurred at the at least one pixel coordinate and to keep the polarity value of at least one pixel coordinate where the event has not occurred;

an outputting process for outputting the binary image by using the brightness array list updated by the updating process during the shooting period; and a correcting process for correcting the polar value of the intermediate of the brightness array list updated by the updating process during the shooting period, wherein the correcting process searches the at least one pixel coordinate where the event has not occurred for the polarity value being the intermediate in the brightness array list from the closest changed coordinate having the polarity value being the negative or the positive in the brightness array list in accordance with a searching direction which is the same direction of the movement of the black and white shooting object relative to the event camera, and the correcting process changes the polarity value of the at least one pixel coordinate where the event has not occurred to the same polarity value of the changed coordinate.

17. The non-transitory computer-readable medium of claim 16, wherein the correcting process retains the polarity value of the intermediate of the brightness array list next to the changed coordinate of the brightness array list within a predetermined permitted time length and changes the polarity value of the at least one pixel coordinate where the event has not occurred to the same polarity value of the changed coordinate after the permitted time length.

18. The non-transitory computer-readable medium of claim 16, wherein the black and white shooting object moving relative to the event camera during the shooting period is a two dimensional binary code, and the binary code is recovered.

* * * * *